United States Patent [19]
Ferguson et al.

[11] Patent Number: 5,386,658
[45] Date of Patent: Feb. 7, 1995

[54] BEAD WITH DUAL-DIAMETER BORE

[75] Inventors: Kenneth A. Ferguson; William J. Black, both of Roseburg, Oreg.

[73] Assignee: Spirit River, Inc., Roseburg, Oreg.

[21] Appl. No.: 66,762

[22] Filed: May 24, 1993

[51] Int. Cl.⁶ .............................................. A01K 85/00
[52] U.S. Cl. .................... 43/42.25; 43/42.37; 43/44.9
[58] Field of Search ............ 43/42.25, 44.9, 42.37, 43/42.38

[56] References Cited

U.S. PATENT DOCUMENTS

| | | | |
|---|---|---|---|
| 1,557,083 | 10/1925 | Peckinpaugh | 43/42.37 |
| 1,557,771 | 10/1925 | Peckinpaugh | 43/42.37 |
| 3,947,990 | 4/1976 | Johnson | 43/44.9 |
| 4,163,337 | 8/1979 | Kress | 43/42.25 |
| 4,930,249 | 6/1990 | Johns | 43/42.25 |
| 4,942,689 | 7/1990 | Link | 43/44.9 |
| 5,207,016 | 5/1993 | Pate | 43/44.9 |

FOREIGN PATENT DOCUMENTS 316323  10/1969  Sweden .............................. 43/42.25

*Primary Examiner*—Kurt C. Rowan

[57] ABSTRACT

A metallic bead of appropriate size and shape for use as the head of a fishing fly has a bore for accepting a hook shank. The bore is of a smaller diameter at the front end and of a larger diameter at the rear end for approximately two thirds of the length of the bead. The bead is cut off at each end so that the overall length of the bore is 85% of the major diameter of the bead itself.

6 Claims, 1 Drawing Sheet

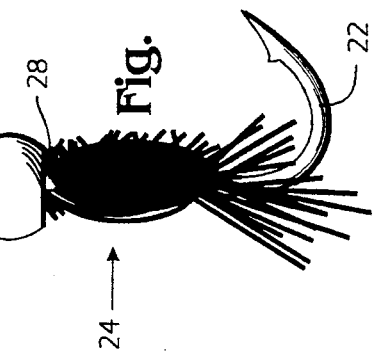
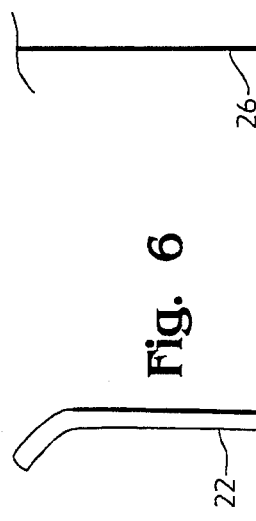
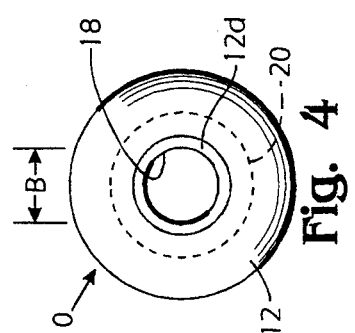
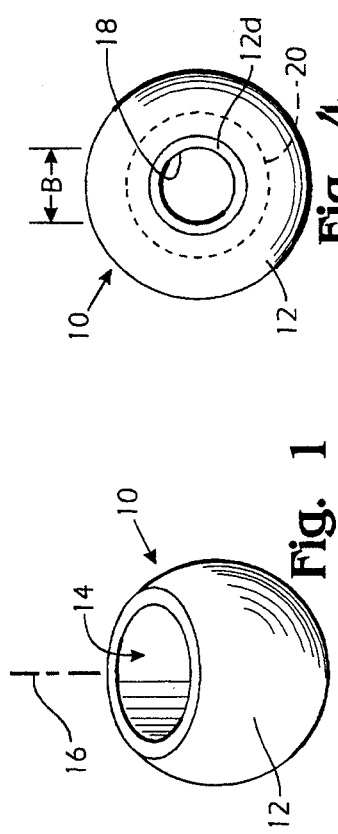
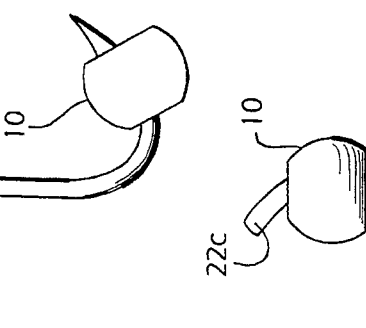
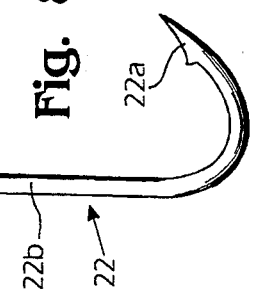
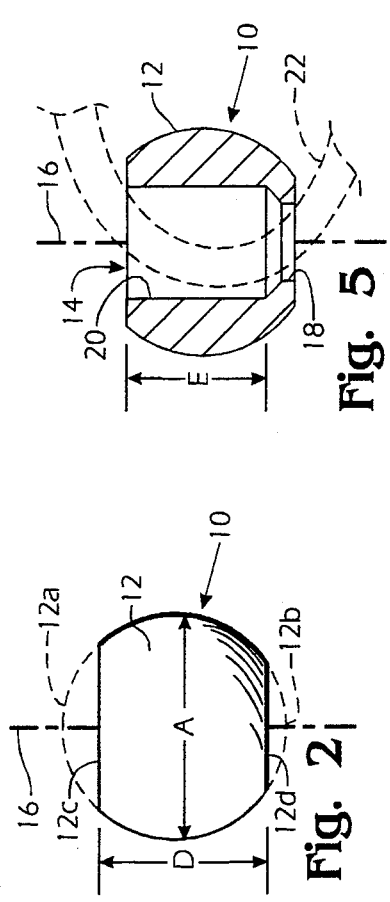
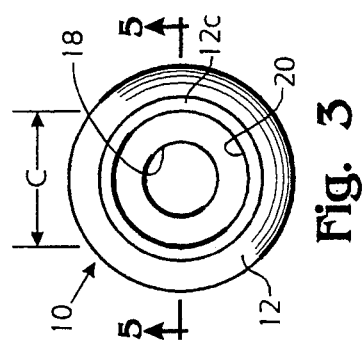

BEAD WITH DUAL-DIAMETER BORE

BACKGROUND OF THE INVENTION

1. Field of the Invention

This invention relates to fishing lures, and in particular to beads with a dual-diameter bore for use in making artificial flies.

2. Related Art

Artificial flies for use with conventional fly casting gear utilize a wide variety of materials both natural and manufactured. A modern development in the design and construction of flies intended to be fished below the surface of the water is to place a brass bead over the shank of the hook but behind the eye of the hook. This gives weight to the fly which makes it sink to the desired depth. Placing the weight at the front end of the fly gives a fish-attracting jigging motion to the fly when the line is tightened and loosened by the rod tip motion of the fisherman. A metallic bead has the further capability of being polished or plated in a variety of materials and polished to a shine that attracts fish to strike.

The alternative is to wrap a lead wire around the hook shank to weight the fly, but this does not have the desired visual characteristics. Weights in the shape of small dumbbells can also be tied to the hook behind the hook eye to provide weight and color. However, these require the additional steps of being properly oriented upon the hook shank and then being securely tied in place. The metallic bead serves all of the desirable purposes in one quick and cost effective step.

Metallic beads have been used in Europe for approximately 40 years for the purpose of forming the front end of artificial flies used in the sport of angling for game fish. These fly patterns were first popularized in the United States beginning in 1990. A wide variety of beads have been used for this purpose. The vast majority of these beads are intended to be used as spacers and attractors on spinning and wobbling metal bodied lures designed to be cast and retrieved by use of spin casting tackle.

Hollow beads from the jewelry industry are frequently used as well. The hollow beads correctly fit a large number of hook styles and shank sizes but do not provide the needed weight. The brass beads used by the manufacturers of spinning lures provide the desired weight and color characteristics but the single diameter hole bored through the bead is either too large to fit up against the hook eye or too small to allow clearance for the curve of the hook.

There thus remains the need for a bead for use in constructing artificial fishing flies that has the desired weight While also being capable of both fitting on the shank of the hook without slipping over the hook eye.

SUMMARY OF THE INVENTION

A bead according to this invention overcomes these limitations of the prior art. In particular, the present invention provides a bead having a body with a bore extending through the body, the bore having a first portion with a first diameter and a second portion with a second diameter greater than the first diameter.

In the preferred form of the invention, a bead drilled with the small bore is counterdrilled for approximately 75% of its length with a larger diameter bore which creates the additional clearance needed for many fly hooks to be threaded through the bead. Additionally, the bead is trimmed to slightly flatten the front and back of the bead. This results in a bore length that is approximately 85% of the major diameter of the bead. This shortening of the bore results in an effective increase in the clearance needed for the curved portion of the hook shank, thereby limiting the size requirements of the larger diameter bore.

This bead, when made of metal and located adjacent to the hook eye with an artificial eye provides a weight and shape that makes the fly sink rapidly with a jigging motion that is enticing to many types of game fish.

These and other features and advantages of the present invention will be apparent from the following detailed description of the preferred embodiment of the invention and as illustrated in the accompanying drawings.

BRIEF DESCRIPTION OF THE DRAWINGS

FIG. 1 is a perspective view of a bead made according to the invention.

FIG. 2 is a side view of the bead of FIG. 1.

FIG. 3 is a view of the bead of FIG. 1 as seen from the top of that figure.

FIG. 4 is a view of the bead of FIG. 1 as seen from the bottom of that figure.

FIG. 5 is a cross section of the bead of FIG. 1 taken along the line 5—5 in FIG. 3.

FIG. 6 is a side view of the bead of FIG. 1 being inserted on a fishing hook.

FIG. 7 is an enlarged cross section of the bead of FIG. 6.

FIG. 8 is a view similar to FIG. 6 showing the bead in position adjacent to the eye of the hook.

FIG. 9 is a view of a completed artificial fishing fly attached to a fly line and using the bead of FIG. 1.

DETAILED DESCRIPTION OF THE PREFERRED EMBODIMENT

Referring initially to FIGS. 1–5, a bead made according to the invention is shown generally at 10. Bead 10 is spherical, having a diameter A. The bead includes a body 12 having a bore shown generally at 14 extending along an axis 16, preferably extending through the center of the body. Bore 14 includes a smaller section 18 having a diameter B and a larger section 20 having a diameter C. Ends 12a and 12b of the body, shown in dashed lines in FIG. 2 are removed, leaving respective flattened surfaces 12c and 12d adjacent to the exposed ends of bore 14. This leaves body 12 with an effective length D along axis 16.

Most metals, such as brass, suitable for construction of such beads can be plated with copper, nickel, gold, silver, etc. to produce beads of different color and shine. During construction, the spherical body is drilled to produce smaller-diameter section 18. This section must be large enough to accept the barb 22a and shank 22b of a hook 22 of a selected size or range of sizes, as shown in FIGS. 6–9. The bead body is then counterdrilled for approximately two thirds of its length to produce larger-diameter section 20. The larger-diameter section creates the additional clearance needed for many fly hooks to be threaded through the bead, as is illustrated particularly in FIG. 7. Additionally, the removal of bead ends 12a and 12b results in a bore length that is approximately 85% of the major diameter of the bead. This shortening of the bead results in the larger bore section having a length E that is about 75% of length D of the bore. This produces an effective increase in the clearance needed for the curved portion of the hook shank, as is illustrated in dashed lines in FIG. 5, thereby limiting the size requirements of the larger diameter bore.

The bead preferably has a diameter A that ranges from 0.100" to 0.250" to conform to the dimensions of conventional beads, but is not limited by these dimensions. A 0.100" diameter bead has a bore with a smaller diameter of 0.040" and a larger diameter of 0.060". A 3/16" bead has a bore with a smaller diameter of about 0.050" and a larger diameter of about 0.090". These dimensions are found to provide a certain optimization in the size of the larger diameter bore section in order to maximize the weight of the bead.

FIG. 9 shows a completed artificial fly 24 supported on a fly line 26. Fly 24 includes a bead 10 made according to the invention, a hook 22, and an artificial fly body 28. The portion of fly body 28 adjacent to bead 10 my be pressed up into the larger-diameter portion of bore 14 in order to secure the bead against the hook eye.

Variations in the dimensions and proportions could be made by persons skilled in the art without negating the effective features of this invention. These changes are included in the teaching of the disclosure, and it is intended that the invention be limited only by the scope of the claims appended hereto.

We claim:

1. A bead for use with an artificial fishing fly constructed on a fish hook, the bead comprising a generally spherical body having a body diameter a bore extending through the body, with the body being flattened around at least one end of the bore, whereby the bore length is less than the body diameter, the bore having a first portion of a first length with a uniform first diameter and a second portion of a second length greater than the first length and with a second uniform diameter greater than the first diameter.

2. A bead according to claim 1 wherein the bore length is between 0.8 and 0.9 times the body diameter.

3. A bead according to claim 2 wherein the bore length is 0.85 times the body diameter.

4. A bead according to claim 1 wherein the body is flattened around both bore ends.

5. A metallic bead for use with an artificial fishing fly constructed on a fish hook, the bead comprising a spherical body with a body diameter and having a bore extending through the body, the body being flattened around each of the bore ends so that the length of the bore is substantially equal to 0.85 times the body diameter, the bore having a first portion with a first diameter less than half the body diameter and a second portion with a second diameter at least 1.5 times the first diameter the first diameter, the length of the second portion being substantially equal to 0.75 times the bore length.

6. An artificial fly comprising:
   a fish hook having a barb, curved shank, and eye;
   a metallic bead positioned on the shank of the fish hook adjacent to the hook eye, the bead comprising a generally spherical body having a bore extending through the body and sized to freely receive the barb and shank of the hook, the bore having a first portion positioned adjacent to the eye of the hook and with a first diameter sized smaller than the hook eye, and a second portion with a second diameter greater than the first diameter; and
   an artificial fly body attached to the shank of the hook with the bead adjacent to the hook eye and a portion of the fly body positioned in the second portion of the bore of the bead.

* * * * *